(12) United States Patent
Vitsnudel et al.

(10) Patent No.: US 8,599,281 B2
(45) Date of Patent: Dec. 3, 2013

(54) APPARATUS FOR ANTI COLOR ROLLING

(75) Inventors: Ilia Vitsnudel, Even Yeuda (IL); Yuri Milich, Netanya (IL); Efrat Swissa, Ramat Ishay (IL)

(73) Assignee: Broadcom Corporation, Irvine, CA (US)

( * ) Notice: Subject to any disclaimer, the term of this patent is extended or adjusted under 35 U.S.C. 154(b) by 437 days.

(21) Appl. No.: 12/873,374

(22) Filed: Sep. 1, 2010

(65) Prior Publication Data

US 2011/0050966 A1 Mar. 3, 2011

Related U.S. Application Data

(60) Provisional application No. 61/239,076, filed on Sep. 2, 2009.

(51) Int. Cl.
*H04N 9/73* (2006.01)

(52) U.S. Cl.
USPC .......................................... 348/226.1

(58) Field of Classification Search
None
See application file for complete search history.

(56) References Cited

U.S. PATENT DOCUMENTS

| | | | | |
|---|---|---|---|---|
| 2005/0225649 | A1* | 10/2005 | Shinotsuka | 348/226.1 |
| 2006/0139164 | A1* | 6/2006 | Tsuji | 340/522 |
| 2008/0088432 | A1* | 4/2008 | Merritt | 340/511 |
| 2010/0039253 | A1* | 2/2010 | Zang et al. | 340/539.1 |

* cited by examiner

*Primary Examiner* — Albert Cutler
(74) *Attorney, Agent, or Firm* — Brinks Gilson & Lione

(57) ABSTRACT

The subject matter discloses a color rolling reduction apparatus, comprising: an antenna (99) for receiving signals; a detector (330) linked to the antenna, for detecting low signals from the signals received by the antenna, the low signals are associated with a power supply connected to a light source; and an amplifier for amplifying the low signals; wherein the low signals that are amplified are for synchronizing of a functionality of a camera.

18 Claims, 8 Drawing Sheets

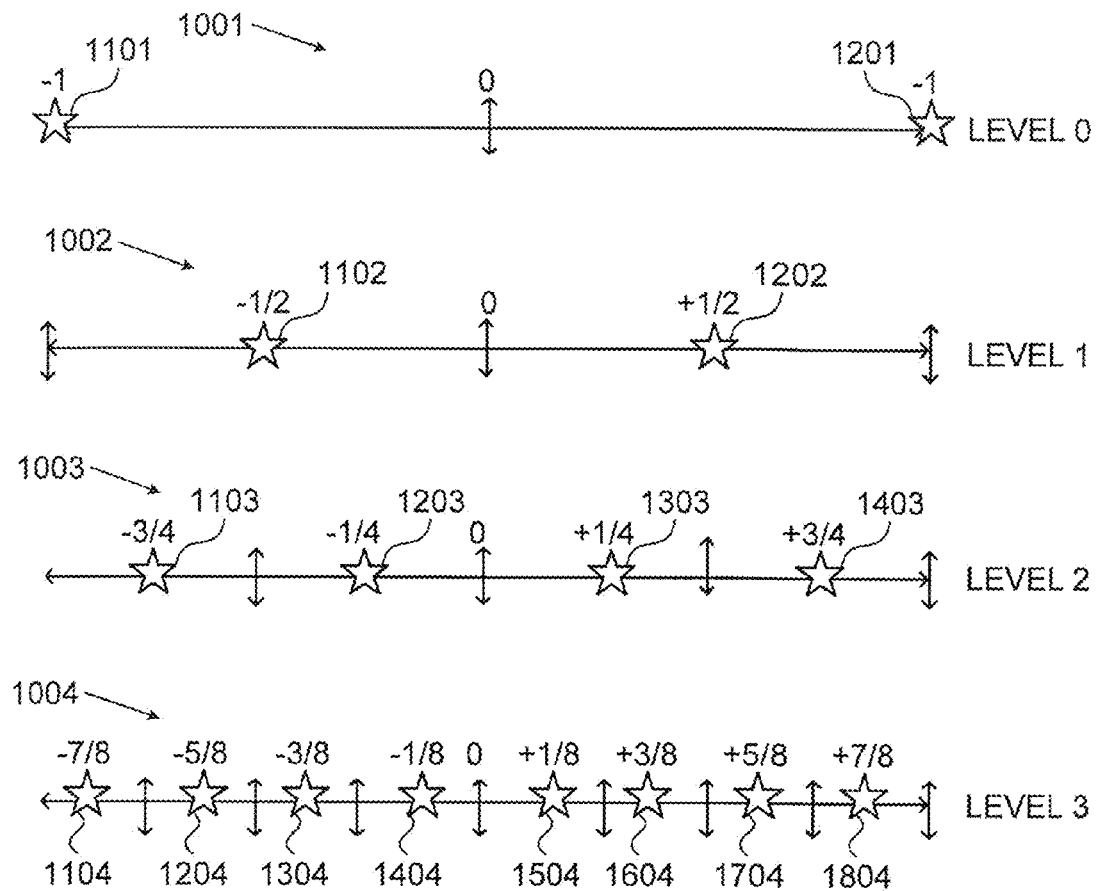
FIG. 10
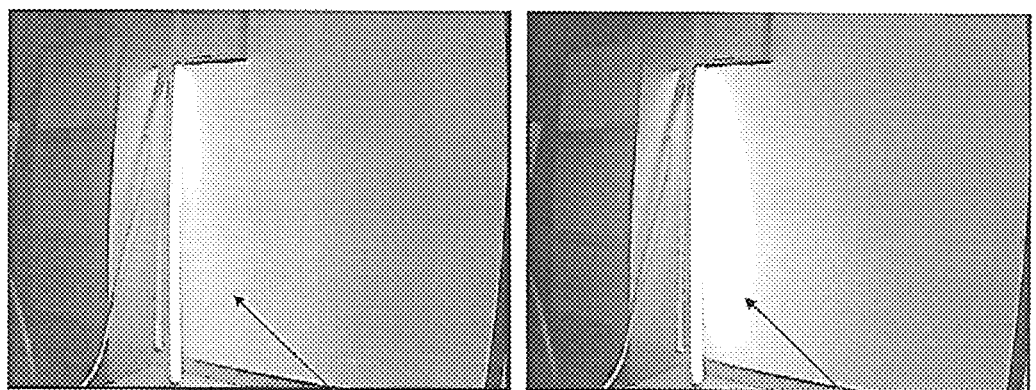
FIG. 11A
FIG. 11B

APPARATUS FOR ANTI COLOR ROLLING

FIELD OF THE INVENTION

The present disclosure relates to the field of color rolling in general, and to color rolling in video camera, in particular.

BACKGROUND

Color Rolling is a slow change of the image color when the video is being taken under the illumination of lamps that are powered by a fluctuating power supply and in particular with lamps such as fluorescent lamp. By fluctuating power supply is meant power supply that may be changed periodically. The lamp may be a fluorescent lamp. The light of such lamps may be powered by AC power line, provides illumination that changes with a periodicity twice faster than the power line. On the other hand, video camera operates at a frequency that is very close to that of the power line. The operation of the video camera is typically not synchronized with the power line. The difference between the sinusoid of the power line and the sinusoid of the lamp light illumination may cause a slow varying change in the illumination that is seen by the camera when sequential frames are captured. The difference between the sinusoid of the power line and the sinusoid of the lamp is termed herein as a beating effect. This change in the illumination may be seen both in the luminance and in the chrominance domains. In the luminance domain, the difference appears as if the output signal level of the camera is fluctuating slowly, increasing and decreasing periodically. In the chrominance domain, the difference produces artificially looking colors with tones that are circling through the gamut.

Color rolling is especially significant in cameras that do not control automatically the lens iris, or operate in the Wide Dynamic Range (WDR) mode. Typically when the camera do not control automatically the iris, its exposure control is done thorough the electronic shutter that controls the exposure time. If the lens are fully opened then the shutter becomes small. The opening time is lower than one full period of the fluorescent lighting illumination. Similarly, in the WDR camera, the Short channel is set to make short time exposure to cope with brightly lit portions of the scene, so the exposure is also much smaller than the fluorescent period. FIG. 1 shows the differences in the strength of the output image as a result of the short time exposure. Since the camera exposure 101 is not synchronized with the light illumination 102, the strength of the output image 103, and the color may change throughout the time.

A long exposure may cover almost the whole lighting period and thus may reduce the changes in the output image because the same intensity is observed during all the frames. FIG. 2 shows that the output image 203 is stable when the camera exposure 202 is long and substantially covers the whole light illumination period 201. However, a long exposure may not be adequate when there is plenty of light.

Method known in the art, which are typically used in most cameras today, provide a partial solution to the color-rolling problem. Typically, some method of color rolling state detection is employed, either by detecting periodic color fluctuations in some predefined color space, or by detecting periodical luminance changes, indicating the presence of the periodical lighting. Based on the detection of color rolling phenomena, one, or a combination of common solutions is used. The first solution is to reduce significantly the color of the Short channel in case of WDR camera or the color of the Normal channel in case of normal camera with shutter that is less than one full period of fluorescent lighting. Such a solution may cause the color level to be low and thus may cause the whole frame to look pail and not vivid. The second solution attempts to find a proper White Balance matrix that reduces the color rolling color phenomena while still keeping reasonable colors in the areas not strongly affected by the fluorescent light. In cases where there is only one color matrix for both Long and Short channels such as usually the case in WDR camera, changing the matrix that resolves color rolling in the short channel produces an artificial color rolling in the long channel.

Another method known in the art can be used only when the camera is connected to an AC supply. In such a case, the operation of the camera may be synchronized with the AC supply as a result of measuring the frequency of the AC supply. Such synchronization is termed herein as Line-lock. Such synchronization causes the operation of the camera to be matched to the lamp light, cycle, phase or a combination thereof.

BRIEF SUMMARY OF THE INVENTION

One exemplary embodiment of the disclosed subject matter is a color rolling reduction apparatus, comprising: an antenna for receiving signals, a detector linked to the antenna, for detecting low signals from the signals received by the antenna, the low signals are associated with a power supply connected to a light source and an amplifier for amplifying the low signals. The low signals that are amplified are for synchronizing of a functionality of a camera. The light source is a fluorescent light. The apparatus further comprising a trigger for triggering the camera when the low signals are above a threshold. The apparatus further comprising a synchronizer for the synchronizing of the functionality of the camera. The power supply is an ac power supply. The apparatus further comprising a sharpening component for sharpening and for amplifying the low signal.

Another exemplary embodiment of the disclosed subject matter is a color rolling reduction method, comprising receiving signals through an antenna; detecting low signals from the received signals, the low signals are associated with a power supply connected to a light source; and amplifying the low signals; wherein the low signals that are amplified are for synchronizing of a functionality of a camera. The method of further comprising the synchronizing of the functionality of the camera. The synchronization comprises one member of the group consisting of changing an internal clock frequency and changing the number of pixels in a frame. The functionality of the camera comprises a cycle time of the camera. The functionality of the camera comprises a camera phase relative to a reference phase. The functionality of the camera comprises an exposure start time.

Yet another exemplary embodiment of the disclosed subject matter comprises a color rolling reduction method; the method comprising measuring a change of colors in a frame of a camera; calculating a difference of phases from the measuring; wherein the calculating is for synchronizing a functionality of the camera according to the difference of phases and wherein the change of the colors is as a result of a change in a light and wherein the difference of phases is a difference between a phase of a power source of the light and a functionality of the camera. the functionality of the camera comprises a cycle time of the camera. the functionality of the camera comprises a camera phase relative to a reference phase. The functionality of the camera comprises an exposure start time. The method further comprising the synchronizing of the functionality of the camera according to the difference of phases. the synchronization comprises changing an internal clock the frequency. The synchronization comprises changing the number of pixels in the frame. Yet another exemplary embodiment of the disclosed subject matter comprises a computer program placed on a magnetic readable media for coupling between network users, the computer program, comprising: a first program instruction for measuring a change of colors in a frame of a camera; and a second program instruction for calculating a difference of phases from the measuring; wherein the calculating is for synchronizing an operation of the camera according to the difference of phases and wherein the change of the colors is as a result of a change in a light and wherein the difference of phases is a difference between a frequency of a power source of the light and a frequency of the operation of the camera wherein the first and second program instructions are stored on a computer readable medium.

BRIEF DESCRIPTION OF THE DRAWINGS

The present disclosed subject matter will be understood and appreciated more fully from the following detailed description taken in conjunction with the drawings in which corresponding, like numerals or characters indicate corresponding, or like components. Unless indicated otherwise, the drawings provide exemplary embodiments or aspects of the disclosure and do not limit the scope of the disclosure. In the drawings:

FIG. 10 shows an exemplary diagram illustrating a close loop correction method, in accordance with some exemplary embodiments of the disclosed subject matter;

FIGS. 11A and 11B show the difference between an image captured without anti color mechanism and an image captured with the anti color mechanism, in accordance with some exemplary embodiments of the disclosed subject matter.

DETAILED DESCRIPTION

Figure 1:
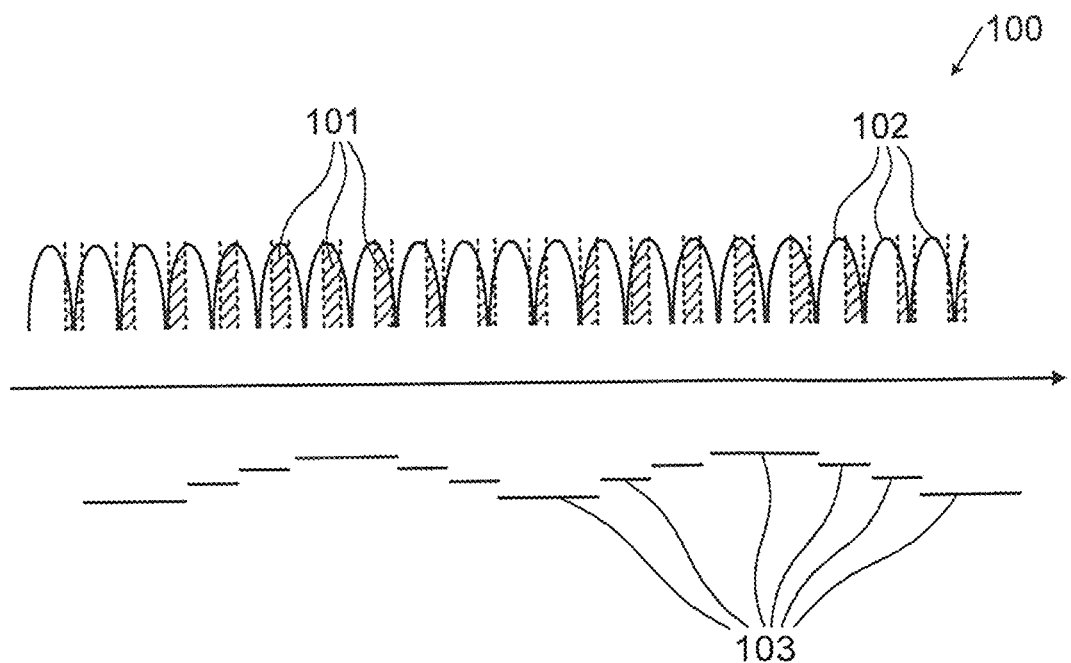
FIG. 1 shows an exemplary diagram of the differences in the strength of the output image from a camera as a result of the short time exposure when anti color mechanism is not used.

One technical problem dealt with by the disclosed subject matter is to solve the color rolling regardless of the exposure time and regardless the connectivity of the camera to the current and without artificially changing the colors. The color rolling may be fixed by providing long exposures as described in FIG. 2. However, such an exposure may not be adequate when there is plenty of light. Color rolling may also be fixed when the camera is powered by an AC supply. In such a case there are method known in the art for measuring the AC supply and synchronizing the operation of the camera according to the measures. However, such methods may not provide a solution when the camera is not powered by the same power line that powers the light source. For example, when the camera is powered by a DC supply or by a battery.

One technical solution for color rolling reduction comprises detecting signals associated with a power supply connected to a light source and synchronizing the functionality of the camera according to the detected signals. The power supply may be AC power supply. The light source may be a fluorescent lamp. The camera functionality may be camera cycle time, the camera phase relative to some reference phase, the exposure start time or a combination thereof. The synchronizing may comprise adapting some internal clock cycle of the camera to the cycle of the illumination light, changing the number of pixels in a line of a frame, or in a frame, changing the start time of the exposure to match a desired phase in the illumination light cycle or a combination thereof.

According to some embodiments, there is provided a synchronizing circuit for detecting signals associated with a power supply connected to a light source and synchronizing the functionality of the camera according to the detected signals. The synchronizing circuit may be operated in an open loop. By an open loop is meant using the trigger derived from the measurement of the illumination power cycle for performing the synchronization. The synchronizing circuit may comprise an antenna for receiving signals from the air for capturing the radiation from the air around the camera and for restoring power line frequency from the captured power radiation. The restoring may be done by detecting low signals from the captured radiation. In some exemplary embodiments, the low signal may be a substantially 50/60 Hz signal. The synchronizing circuit may also comprise a line lock trigger between the antenna and the camera for triggering camera for operating the synchronizing of the operation of the camera with the light whenever the low signal exceeds a threshold level.

Another technical solution for color rolling reduction comprises measuring the changes of the colors that are caused as a result of the changes in the light; concluding a difference of phases from the measuring and synchronizing the camera according to the difference of phases. The difference of phases is the difference between the phase of the light power source and the functionality of the of the camera.

The synchronization may be done by adjusting the video frame time to match the light cycle time. Such an adjustment can be done by changing the frequency of some camera clocks, or by adjusting the number of extra pixels that should be added or subtracted to each video line to compensate for the camera and light frequencies, or by changing the start time of the exposure to match a desired phase in the illumination light cycle.

One technical effect of utilizing the disclosed subject matter is synchronizing between the operation of a camera to the cycle of the power when both short and long exposures are used, and different synchronization phases are used for the short and for the long exposures.

FIG. 1 shows an exemplary diagram of the differences in the strength of the output image from a camera as a result of the short time exposure when anti color mechanism is not used. FIG. 1 shows an exemplary prior art usage of the camera. Since the camera exposure 101 is not synchronized with the light illumination 102, the strength of the output image 103, and the color may be changed throughout the time. The strength of the output signal 103 may be computed as the integral of the light illumination during the time of the camera exposure 101 as shown by the shading.

Figure 2:
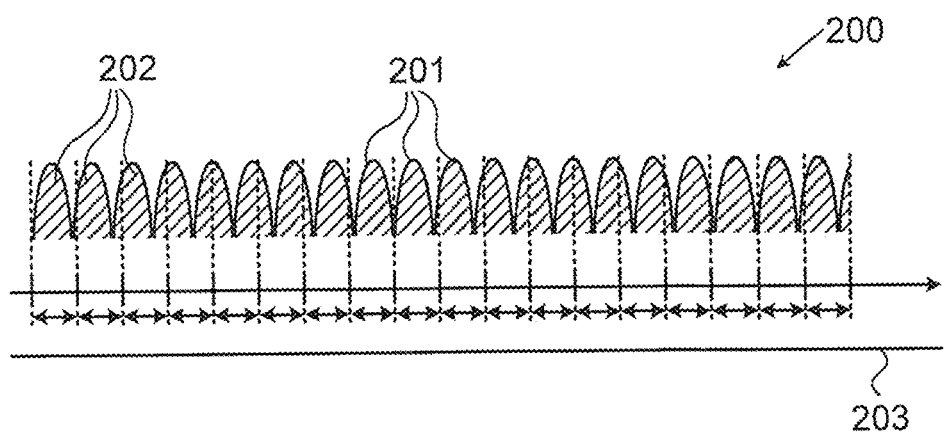
FIG. 2 shows an exemplary diagram of the output image, when the camera exposure is long, in accordance with some exemplary embodiments of the subject matter.

FIG. 2 shows an exemplary diagram of the output image, when the camera exposure is long enough to substantially covers the whole light illumination period, in accordance with some exemplary embodiments of the subject matter. FIG. 2 shows that the output image 203 is stable when the camera exposure 202 is long and substantially covers the whole light illumination period 201. FIG. 2 shows that a long exposure may prevent the color rolling, however, as explained in the background, a long exposure may not be adequate when there is plenty of light.

Figure 3:
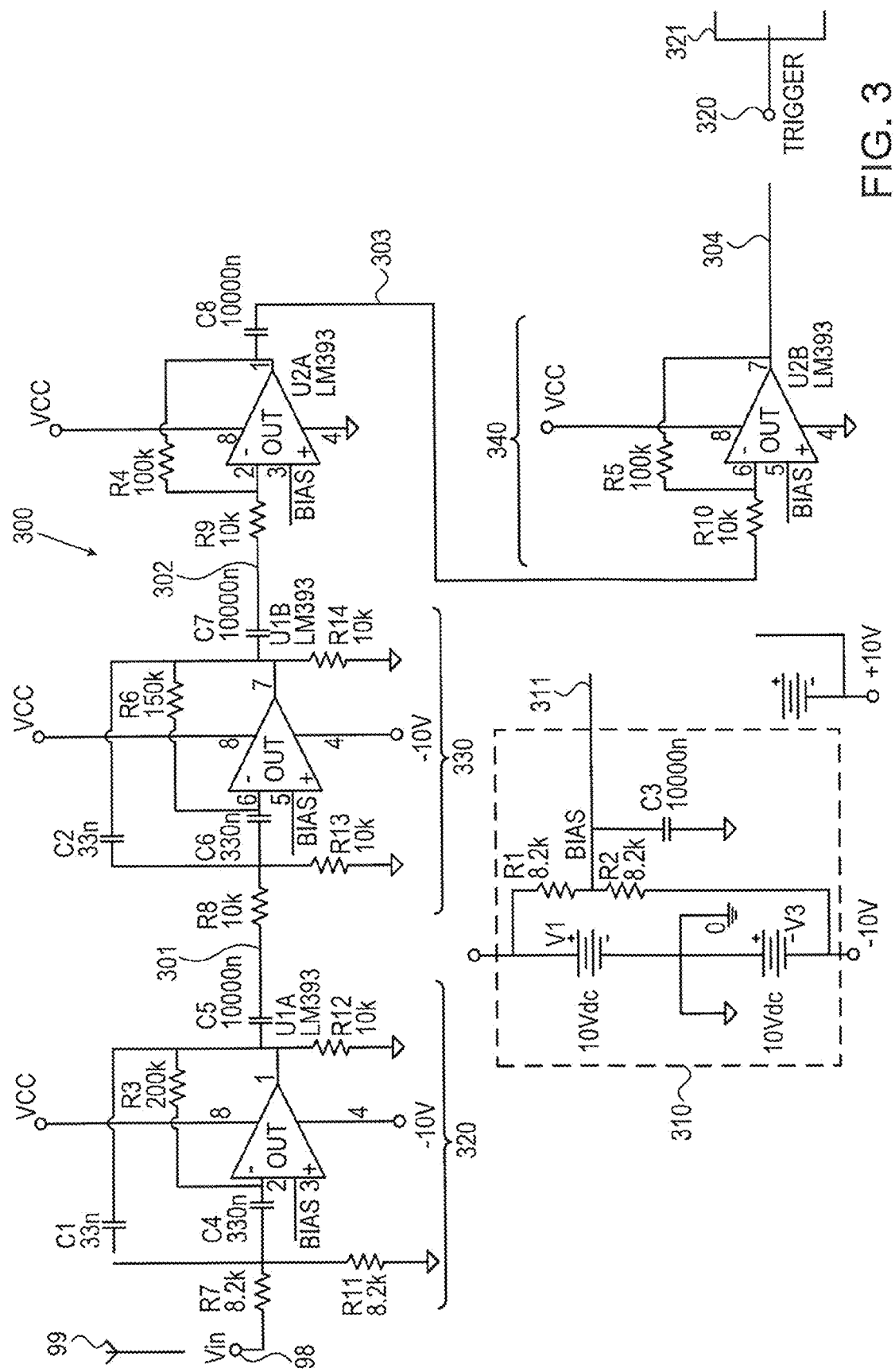
FIG. 3 shows a schematic drawing of a synchronizing circuit for detecting signals associated with a power supply connected to a light source and for synchronizing the functionality of the camera according to the detected signals, in accordance with some exemplary embodiments of the disclosed subject matter.

FIG. 3 shows a schematic drawing of a synchronizing circuit for detecting signals associated with a power supply connected to a light source and for synchronizing the functionality of the camera according to the detected signals, in accordance with some exemplary embodiments of the subject matter. The light source may be a fluorescent light. Synchronizing circuit 300 may comprise one or more detectors shown as 330 and 340 for detecting low signals from the received signals 98 and for amplifying the detected signals 98. The detectors 330 and 340 may be linked to the antenna. In some exemplary embodiments, the circuit 300 may comprise a detector for detecting the low signal and one or more amplifiers for amplifying the low signal. The low signals may be associated with the power supply of the light source. The amplified signal may be used for synchronizing a functionality of the camera 321. In some exemplary embodiments, the amplified signal may be output via a trigger 320 for triggering the camera 321. In some exemplary embodiments, the synchronizing circuit 300 may comprise a sharpening component 340 for sharpening and for amplifying the signal that is output from the detected components illustrated as 320 and 330. The synchronizing circuit 300 may comprise an antenna 99 for detecting low signals present in the air from the received signal 98. The antenna 99 may be connected the point where the signal 98 is received. The antenna 99 may be a small antenna. The range of the frequencies of the low signal may comprise range of frequencies of the power supply; for example, if the power supply is AC the frequency is the frequency of AC power supply. In some exemplary embodiments, such detected signals may comprise signals of substantially 50 Hertz or 60 Hertz. The trigger reconstruction circuit 300 may comprise several steps of filtering and amplification wherein the filtering filters the low signals and the amplification amplifies the filtered signals. The intermediate points illustrated as 301 302 and 303 showing the outputs of the subsequent steps of filtering and amplification for the trigger reconstruction process. Each subsequent step may provide an amplification of the detected signal to make total low signal easily discernable from the surrounding noise. A final output of the circuit 300 may represent the reconstructed trigger 304. The reconstructed trigger signal may be a binary output signal. A BIAS generating circuit 310 may provide a BIAS or reference point 311, which may be used in the steps shown as 301 302 and 303. In some exemplary embodiments, the trigger signal 304 may be connected to the trigger input 320 of a camera 321 for triggering the camera.

Figure 4:
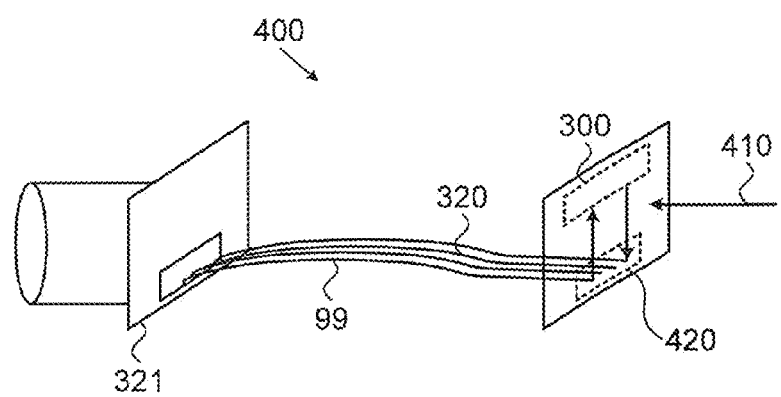
FIG. 4 shows a schematic drawing of an exemplary system comprising a synchronizing circuit and a camera, in accordance with some exemplary embodiments of the subject matter.

FIG. 4 shows a schematic drawing of an exemplary system configuration comprising a synchronizing circuit and a camera, in accordance with some exemplary embodiments of the subject matter. According to one exemplary embodiment, the system may be implemented by positioning the synchronizing circuit 300 on a power or connection board and by locating the antenna 99 as a wire connecting two boards. Referring now to the drawing, system 400 comprises the camera board 321 connected by the antenna 99 to a power board 420 of the synchronizing circuit 300 (not shown). The power board 420 may be powered by DC voltage 410. It should be noted that other system configurations such as implementing the synchronizing circuit 300 on the main camera board 321 or connecting the antenna 99 externally to the camera, may be used.

Figure 5:
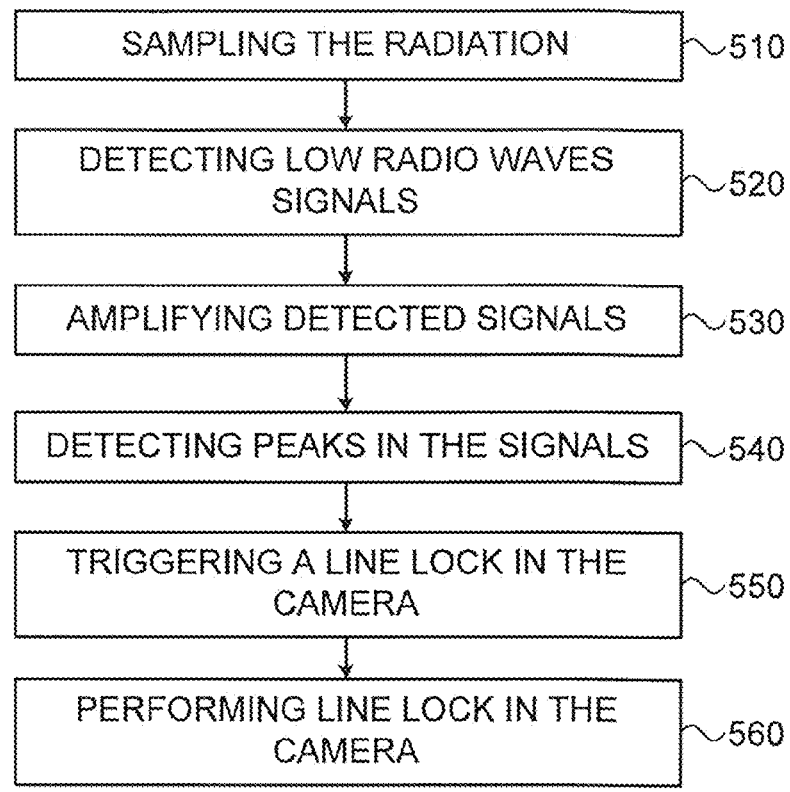
FIG. 5 shows a flowchart diagram of a synchronizing circuit for detecting signals associated with a power supply connected to a light source and for synchronizing the functionality of the camera according to the detected signals, in accordance with some exemplary embodiments of the disclosed subject matter.

FIG. 5 shows flowchart diagram of an open loop method of for detecting signals associated with a power supply connected to a light source and for synchronizing the functionality of the camera according to the detected signals, in accordance with some exemplary embodiments of the disclosed subject matter.

According to some exemplary embodiments, the color rolling may be fixed by restoring power line indications from the power line radiation that is present in the air around the camera. Referring now to the drawings:

In step 510, the radiation in the area where the camera may be placed is sampled for detecting signals of the current flowing through the lamp that is powered by a fluctuating power supply. The sampling may be done by using a signal picked by an antenna.

In step 520, low signals may be detected from the sampled signal representing the radiation. Such low signals may be the signals reflecting the current with which the camera should synchronized. Such low signals may be substantially in the range of around 50 or 60 Hz.

In step 530, the low signals may be amplified for detecting a threshold level crossing. An exemplary amplifier frequency response is disclosed in FIG. 6.

In step 540, a level crossing may be detected. Detecting level crossing may indicate the detecting of a peak in the signal.

In step 550, which may take place when a trigger from the 50/60 Hz picked power line becomes available, the camera may be triggered with a line lock trigger. By a line-lock is meant a process for synchronizing the camera with the picked signal and thus, synchronizing the camera with the cycle of lights. According to some embodiments, the camera may enter a Line-lock mode and the operation of the camera may be synchronized with the illuminating light that is powered by a fluctuating power supply. According to theses embodiments, no color-rolling phenomenon occurs because the camera phase follows exactly the light phase. According to some other embodiments, the system may enable the setting of a constant relative phase between the camera and the lighting, in order to sample a desired portion of the light period. Adjusting the phase can set the colors from the short channel to a desired tint; typically, the preferred tint is white. This phase adjustment, may provide a simple mechanism for independent control of the white balance for both long and short channels in case of WDR camera. Two or three degrees of freedom, one or two for the Long channel and one for the Short channel may be handled by using two or three separate control variables: one is a common White Balance (WB) matrix and the others are the setting of relative phase between the camera and the lighting. According to some embodiments, the adjusting of both control variables may be done by first setting a White Balance matrix for the Long channel using a regular White Balance procedure and then establishing for a relative phase that provides a proper White Balance for the Short channel. Changing the phase for the Short channel does not affect the White Balance of the Long channel, in the common case where the exposure of the Long channel is set to cover the full lighting period, as the colors become independent of the relative phase. In case the exposure time of the long channel is shorter than cycle time of power supply, the White Balance matrix may be searched for both channels simultaneously, by adjusting the White Balance matrix the relative phase of the Short channel and the relative phase of the Long channel together. Any optimization method, such as gradient descent, may be used for the adjusting.

Figure 6:
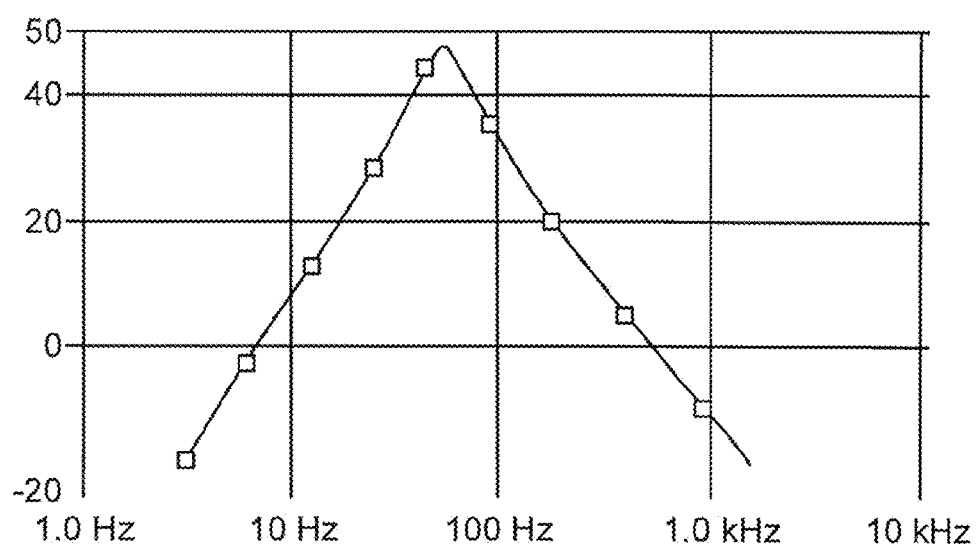
FIG. 6 shows a schematic drawing of the resulting frequency response, in accordance with some exemplary embodiments of the disclosed subject matter.

FIG. 6 shows a schematic drawing of the resulting frequency response, in accordance with some exemplary embodiments of the disclosed subject matter. As can be seen from the figure, both 50 and 60 Hz frequencies are significantly amplified.

Figure 7:
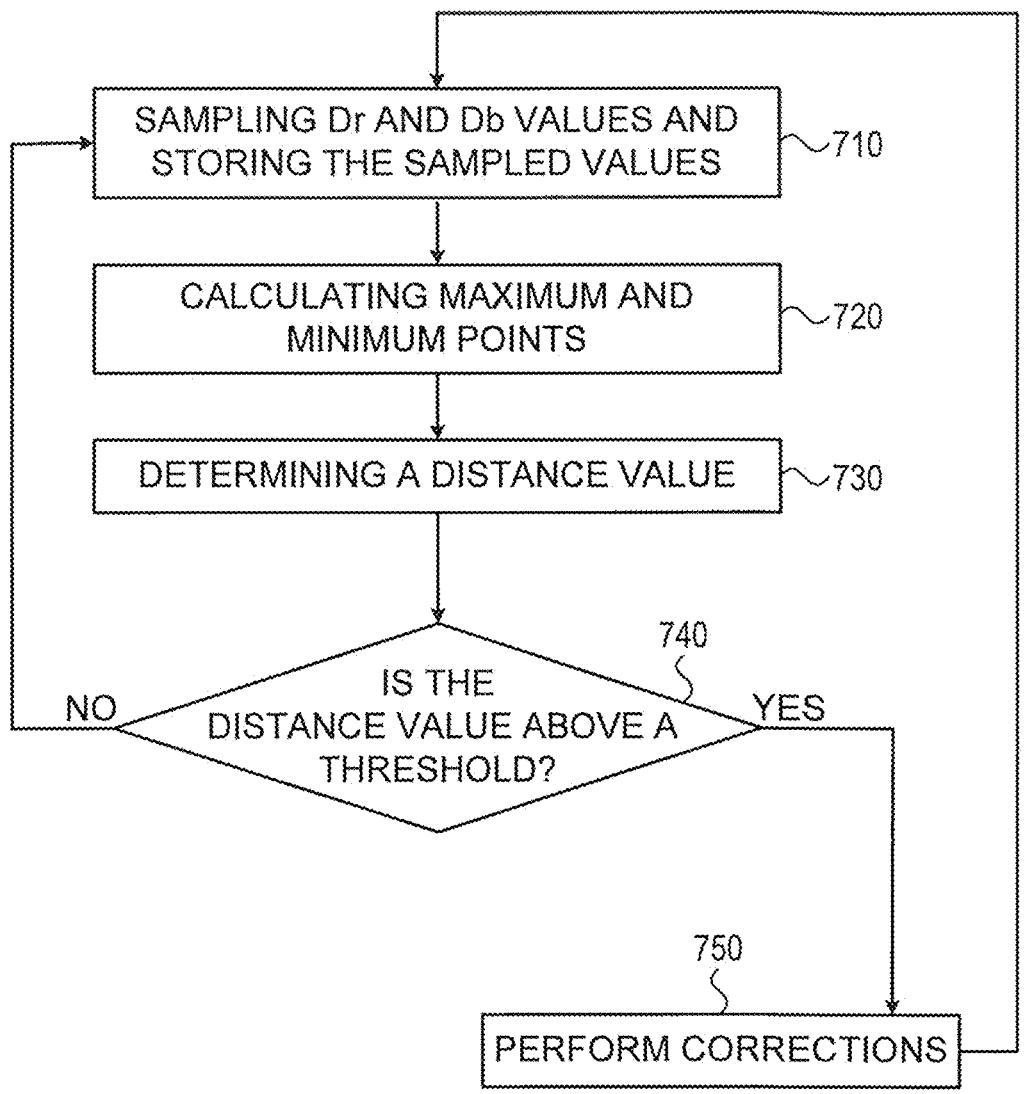
FIG. 7 shows a flowchart diagram of a close loop method for detecting signals, from the camera image statistic, associated with a power supply connected to a light source and for synchronizing the functionality of the camera according to the detected signals, in accordance with some exemplary embodiments of the disclosed subject matter.

FIG. 7 shows a flowchart diagram of a close loop method for detecting signals from the camera image statistic associated with a power supply connected to a light source and for synchronizing the functionality of the camera according to the detected signals, in accordance with some exemplary embodiments of the disclosed subject matter. By a close loop is meant a method of measuring the effect of phase different between the video frame time and the light cycle. Such a method may change the video frame time, as long as there is a substantial difference. The measurement of the difference may be done by measuring the color rolling. According to some embodiments, there is provided a method for adjusting the video frame time or the exposure start time, to match the light cycle time duration, phase or a combination thereof. Such an adjustment can be done by changing the frequency of some camera clocks, or by adjusting the number of pixels that should be added or subtracted to each video line to compensate for the camera and light frequencies or by adjusting the exposure start time to match a desired phase in the light cycle.

Referring now to the drawing; in step 710, a Detection of color change may be performed by sampling the colors values. Sampling the colors values may be done by sampling the Dr (Deviation Red) and Db (Deviation Blue) values and by storing the sampled values in a storage. The storage may comprise an array. The array may have pre-defined number of entries. The pre-defined number of entries may be, for example seven. Each entrance may comprise a Dr value and a Db value, such that Dr and Db represent color data. The sampling of the Dr and the Db values may be done every pre-defined period. The pre-defined period may be for example one second. In such a case, the measurement is done one second after the last measurement. According to some other embodiments, the Dr and Db can be averaged over a pre-defined period. Step 710 may be repeated until the array is field. In some exemplary embodiments, the array may be field substantially after ten seconds.

In step 720, which may be performed when the array is filled, the maximal points (MaxDr and MaxDb) and the minimal points (MinDr and MinDb) are calculated from the values that were stored in the array in step 710. According to some embodiments, the maximal or minimal points may be calculated in accordance with one of Dr or Db, preferably Dr, since the Dr range is typically larger than the Db range. Thus, MaxDb relates to the Db value corresponding to the maximal Dr value and MinDb relates to the Db value corresponding to the minimum.

In step 730, a color distance factor may be detected. The color distance factor may be calculated as the Euclidean distance between the minimum Dr and Db and the maximum Dr and Db average points. The color distance factor may be calculated as $(MaxDr-MinDr)^2+(MaxDb-MinDb)^2$. Such a distance factor indicates the change in the color. Such a change in the color may indicate the difference between the frequency of the source of the light and the frequency of the operation of the camera.

In step 740, the distance value may be compared to a threshold for determining if a correction process has to be done. If the correction process is not required, anew sampling as described in steps 710, 720 and 730 is performed.

In step 750, which may be performed if the distance values exceed a threshold, a correction process may be performed. The correction process is explained in greater details in FIG. 8.

Figure 8:
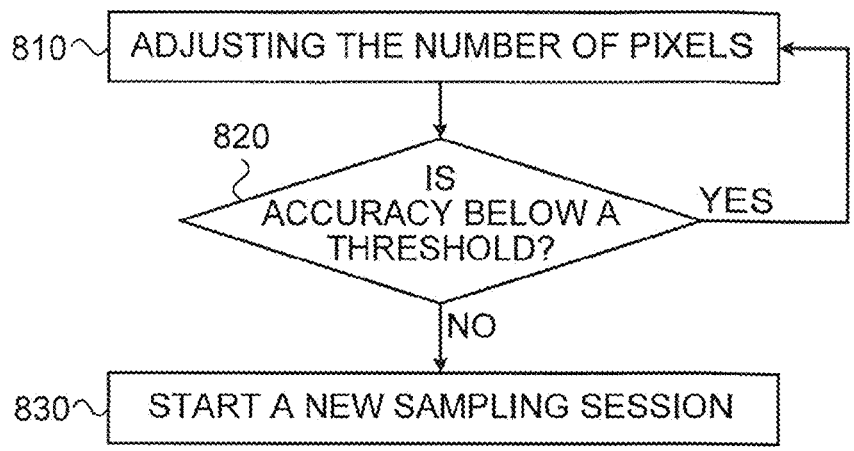
FIG. 8 shows a flowchart diagram of a close loop method of color rolling correction in accordance with some exemplary embodiments of the disclosed subject matter.

FIG. 8 shows a flowchart diagram of an exemplary embodiment close loop method of color rolling correction in accordance with some exemplary embodiments of the disclosed subject matter. In order to perform color-rolling correction, the timing of the camera has to be synchronized with the source light. According to the exemplary embodiment, the number of pixels in a video line may be changed. According to some other exemplary embodiments, some internal camera clocks may be changed for performing the color rolling reduction.

In step 810, the number of pixels may be adjusted. According to some embodiments, the synchronization may be performed by adjusting the number of extra pixels that should be added (or subtracted) to each line in order to nullify the total number of residual pixels required for the synchronization. The estimation of the number of pixels may be done implicitly by increasing (or decreasing) the extra pixels value until the color distance is eradicated.

In step 820, the accuracy level may be compared to a predefined threshold. If the accuracy is smaller than a predefined threshold then step 810 may be repeated. The repetition of step 810 may take few times, such as, for example, four times, wherein in each time, the accuracy level may be refined. The Max/Min correction at the first stage may be +/−1 pixel. It is assumed that the total required correction is small to be restricted to +/− one pixel; otherwise, the algorithm is applied with further convergence levels, handling larger numbers of extra pixels.

At the n-th level, there are $2^n$ different options, but preferably only $2^n-2^{n-1}$ are checked, since the $2^{n-1}$ other options had been examined in the previous stage. As an exception, at level 0 two options are used, The figure below exemplifies the number of trials at each level.

In step 830, The number of pixels to be added in each line is determined by selecting the number that provides the minimal color rolling among the numbers that have been tested at step 810-820 at the accuracy that is satisfied. Next, the process described in FIG. 7 may be repeated.

Figure 9:
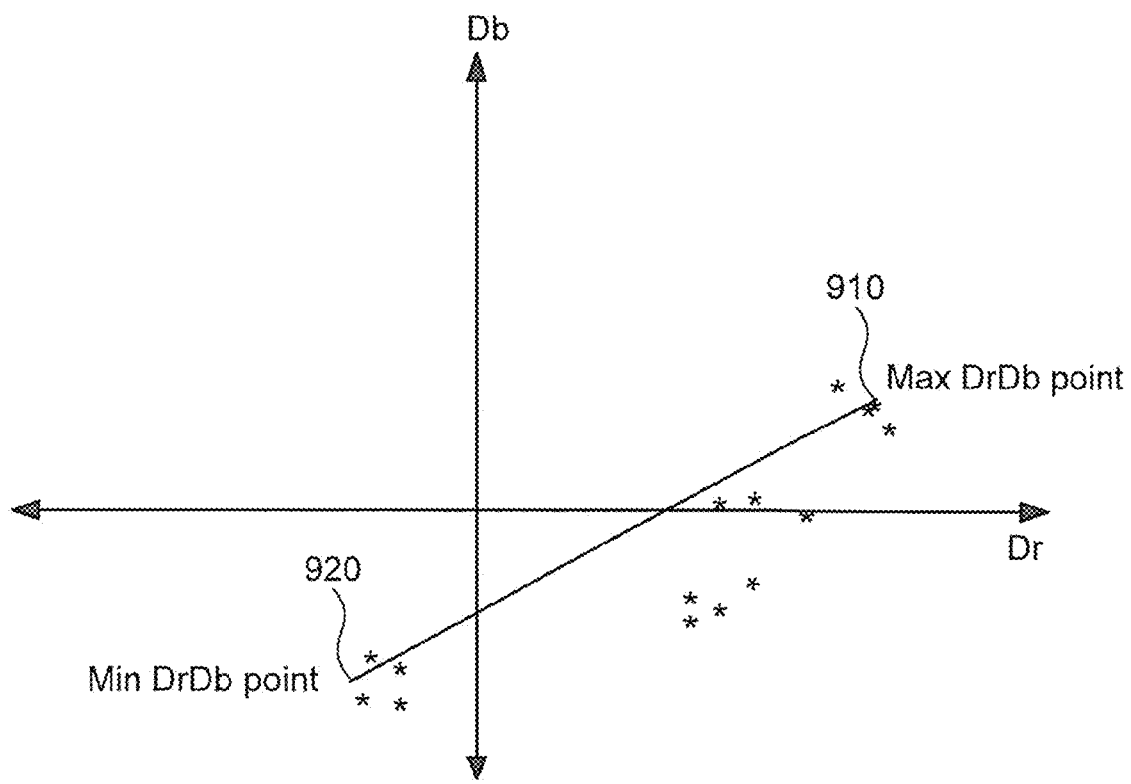
FIG. 9 shows an exemplary diagram of sampling in a DrDb scale, in accordance with some exemplary embodiments of the disclosed subject matter.

FIG. 9 shows an exemplary diagram of sampling in a Dr-Db scale, in accordance with some exemplary embodiments of the disclosed subject matter. A multiplicity of stars indicates a color change. The maximum DrDb point 910 and the Minimum DrDb point 920 indicate the points with the maximum and minimum values.

FIG. 10 shows an exemplary diagram illustrating close loop correction method, in accordance with some exemplary embodiments of the disclosed subject matter. According to some embodiments of the disclosed subject matter, the correction may be done by adding or subtracting pixels in a line in order to synchronize the frequency of the camera to the frequency of the florescent. A first level 1001 shows a level of correction in which up to one pixel showing as 1101 and 1201 may be added or removed. Pixel 1101 shows a pixel that can be removed and pixel 1201 shows a pixel that can be added. A second level 1002 shows a more refined level of correction in which up to two half pixels may be added or removed. Pixel 1102 shows a half pixel that can be removed and pixel 1202 shows a half pixel that can be added. A third level 1003 shows a level of correction in which up to two quarters of a pixel may be added or removed. Pixels 1103 and 1203 show two quarter pixels that can be removed and pixels 1303 and 1403 show two quarter of pixels that can be added. A forth level 1004 shows a level of correction in which up to four eighth of a pixel may be added or removed. Pixels 1104 and 1204 1304 and 1404 show four eighth pixels that can be removed and pixels 1404, 1604, 1704 and 1804 show four eight of pixels that can be added.

FIGS. 11a and 11b show the difference between an image sampled without anti color mechanism and an image sampled with the anti color mechanism. The yellow color 1110 that is show in FIG. 11a is turned into white color 1111 in FIG. 11b.

Figure 12:
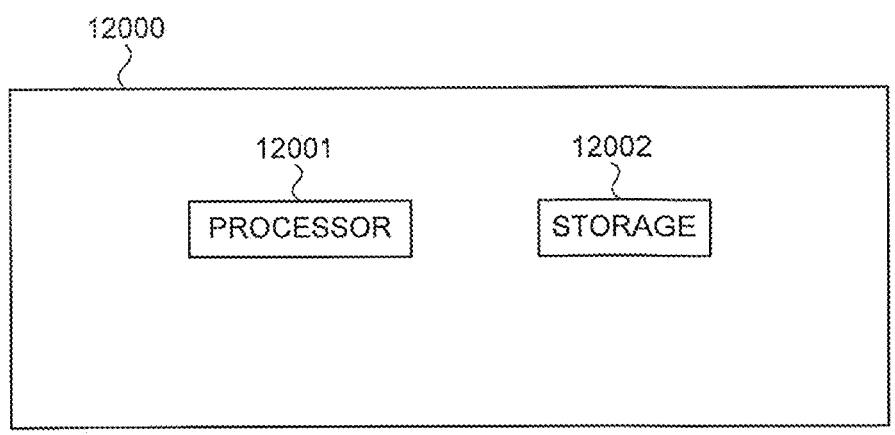
FIG. 12 shows a computerized apparatus for of detecting a cycle of a fluctuated power supply of an illumination light and synchronizing a functionality of the camera with the detected cycle of the illumination light, in a close loop, in accordance with some exemplary embodiments of the disclosed subject matter.

FIG. 12 shows a computerized apparatus for of detecting a cycle of a fluctuated power supply of an illumination light and synchronizing a functionality of the camera with the detected cycle of the illumination light, in a close loop, in accordance with some exemplary embodiments of the disclosed subject matter. Computerized apparatus 12000 comprises a processor 12001 for measuring a change of colors in a frame of a camera and for calculating a difference of phases from the measuring. The calculating is for synchronizing an operation of the camera according to the difference of phases and wherein the change of the colors is as a result of a change in a light. The difference of phases is a difference between a frequency of a power source of the light and a frequency of the operation of the camera. The operation of the camera may include changing the camera cycle time, and/or changing the camera cycle phase, and/or changing the start time of camera exposure. Computerized apparatus 12000 comprises storage 12002 for storing the sampled values. The storage 12002 may comprise an array.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A color rolling reduction apparatus for a video device, comprising: an antenna for receiving signals;
    a detector linked to the antenna, for detecting low signals from the signals received by the antenna, the low signals are associated with a power supply connected to a light source; and
    an amplifier for amplifying the low signals;
    wherein the low signals that are amplified are for synchronizing of a functionality of a camera, the synchronizing being performed by adjusting a number of pixels in a frame.

2. The apparatus of claim 1, wherein the light source is a fluorescent light.

3. The apparatus of claim 1, further comprising a trigger for triggering the camera when the low signals are above a threshold.

4. The apparatus of claim 1, further comprising a synchronizer for the synchronizing of the functionality of the camera.

5. The apparatus of claim 1, further comprising a sharpening component for sharpening and for amplifying the low signal.

6. The apparatus of claim 1, further comprising trigger reconstruction circuit in communication with the camera for triggering the camera, the trigger reconstruction circuit comprising several steps of filtering and amplification to filter and amplify the low signals.

7. The apparatus of claim 6, wherein the output of the trigger reconstruction circuit is a binary signal.

8. The apparatus of claim 1, further comprising a camera board and a power board, the antenna comprising a wire connected between the camera board and the power board.

9. The apparatus of claim 1, wherein the power supply provides an AC power signal to the light source.

10. A color rolling reduction method, comprising:
    receiving signals through an antenna;
    detecting low signals from the received signals, the low signals are associated with a power supply connected to a light source; and
    amplifying the low signals; wherein the low signals that are amplified are for synchronizing of a functionality of a camera, wherein synchronizing comprises changing an internal clock frequency and changing the number of pixels in a frame.

11. The method of claim 10, further comprising the synchronizing of the functionality of the camera.

12. The method of claim 10, wherein the functionality of the camera comprises a cycle time of the camera.

13. The method of claim 10, wherein the functionality of the camera comprises an exposure start time.

14. The method of claim 10, further comprising line lock triggering between the antenna and the camera.

15. The method of claim 14, further comprising synchronizing the camera to a light source based on the line lock triggering.

16. The method of claim 14, wherein the line lock triggering occurs based on the low signals exceeding a threshold level.

17. The method of claim 10, wherein the pixels comprise fractions of pixels that may be added or removed to change the number of pixels in the frame.

18. A color rolling reduction apparatus, comprising:
    a synchronization circuit having an antenna, a trigger reconstruction circuit and a bias circuit, the antenna being configured to receiving signals from a power supply, the power supply providing an AC power signal to a light source, the trigger reconstruction circuit being linked to the antenna for amplifying and filtering low signals from the signals received by the antenna, the low signals being associated with the power supply; and a camera in communication with the synchronization circuit, wherein a functionality of the camera is synchronized based on adjusting a number of pixels in a frame.

* * * * *